US012584345B1

(12) United States Patent
Louer, Jr.

(10) Patent No.: US 12,584,345 B1
(45) Date of Patent: Mar. 24, 2026

(54) MOUNTING ASSEMBLY FOR AUTOMATED WINDOW ACTUATION MECHANISM AND METHOD

(71) Applicant: Robert Louer, Jr., Hershey, PA (US)

(72) Inventor: Robert Louer, Jr., Hershey, PA (US)

( * ) Notice: Subject to any disclaimer, the term of this patent is extended or adjusted under 35 U.S.C. 154(b) by 0 days.

(21) Appl. No.: 18/808,297

(22) Filed: Aug. 19, 2024

Related U.S. Application Data

(60) Provisional application No. 63/533,420, filed on Aug. 18, 2023.

(51) Int. Cl.
*E05F 15/665* (2015.01)
*E05F 15/60* (2015.01)
*E05F 15/77* (2015.01)

(52) U.S. Cl.
CPC ............ *E05F 15/665* (2015.01); *E05F 15/60* (2015.01); *E05F 15/77* (2015.01); *E05Y 2900/148* (2013.01)

(58) Field of Classification Search
CPC ..... E05F 15/665; E05F 15/603; E05F 15/652; E05F 15/60; E05F 15/6896; E05F 15/71; E05F 15/77; E05Y 2900/148
See application file for complete search history.

(56) References Cited

U.S. PATENT DOCUMENTS 1,636,519 A * 7/1927 Larsen .................. E05F 11/382 49/140
1,870,992 A * 8/1932 Freuler ................... E05F 15/79 74/424.78
2,022,848 A * 12/1935 Fuller ................... E05F 15/665 49/362
2,067,106 A 1/1937 Tashjian et al.
2,124,037 A * 7/1938 Lavigne ................ E05F 11/382 180/286
2,345,594 A * 4/1944 Gardner ................ E05F 15/665 49/362
2,399,109 A 4/1946 Geer et al.
2,979,328 A * 4/1961 Henrikson .............. E05F 15/79 49/361
3,691,684 A * 9/1972 Boneck ................. E05F 15/665 49/362
4,229,907 A * 10/1980 Hall ...................... E05F 15/652 49/362
5,440,837 A * 8/1995 Piltingsrud ............. E05D 15/22 74/625
5,634,298 A * 6/1997 Slopack ................ E05F 15/652 49/362
5,826,377 A * 10/1998 Simson ............... E05D 15/0656 49/362
6,343,436 B1 * 2/2002 Milano, Jr. ............. E05F 15/67 49/362
8,056,873 B1 11/2011 Hanley et al.
9,038,317 B2 5/2015 Hansen
9,382,745 B2 7/2016 Plummer
9,903,148 B2 * 2/2018 Rodems ................ E05F 15/652
(Continued)

FOREIGN PATENT DOCUMENTS

GB 2242225 A * 9/1991 ............ E05F 15/665
GB 2297584 A * 8/1996 .............. E05F 15/67
GB 2378218 A * 2/2003 ............ E05F 15/665

*Primary Examiner* — Justin B Rephann
(74) *Attorney, Agent, or Firm* — Hooker & Habib, P.C.

(57) ABSTRACT

An assembly to allow the installation and removal of automated window actuation mechanisms from a window casing fixture.

16 Claims, 9 Drawing Sheets

(56) References Cited

U.S. PATENT DOCUMENTS

| | | | | |
|---|---|---|---|---|
| 10,370,887 | B2 | 8/2019 | Lange | |
| 10,378,266 | B2 | 8/2019 | Walden | |
| 10,633,909 | B2 * | 4/2020 | Urban | H02K 7/06 |
| 10,711,505 | B2 | 7/2020 | Hall et al. | |
| 10,718,150 | B2 | 7/2020 | Hall et al. | |
| 10,829,977 | B2 * | 11/2020 | Bernhagen | E05F 15/641 |
| 10,968,678 | B2 * | 4/2021 | Hall | E05F 15/635 |
| 11,053,727 | B2 * | 7/2021 | Houk | E05F 17/004 |
| 11,603,697 | B2 | 3/2023 | Hall et al. | |
| 11,725,450 | B2 * | 8/2023 | Belding | E05F 15/77 49/31 |
| 12,146,363 | B2 * | 11/2024 | Hall | E05F 15/665 |
| 2006/0150520 | A1 | 7/2006 | Hamazaki | |
| 2007/0011946 | A1 * | 1/2007 | Mullen | E05F 15/665 49/325 |
| 2009/0025296 | A1 * | 1/2009 | Petner | E05F 15/652 49/130 |
| 2012/0169071 | A1 | 7/2012 | LaBarre | |
| 2014/0167927 | A1 | 6/2014 | Rush | |
| 2015/0152676 | A1 * | 6/2015 | Plummer | E05F 15/603 49/506 |
| 2016/0305181 | A1 * | 10/2016 | Valverde | E05F 15/72 |
| 2017/0074021 | A1 * | 3/2017 | Rodems | E05D 15/06 |
| 2017/0254134 | A1 * | 9/2017 | Ben-Arie | E05F 15/665 |
| 2018/0023333 | A1 * | 1/2018 | Lange | E05D 13/1223 49/349 |
| 2019/0040671 | A1 * | 2/2019 | Hall | E05F 15/77 |
| 2019/0112860 | A1 * | 4/2019 | Urban | E05F 15/73 |
| 2019/0277077 | A1 * | 9/2019 | Ben-Arie | E05D 15/165 |
| 2019/0309556 | A1 | 10/2019 | Newman | |
| 2021/0262275 | A1 | 8/2021 | DeMele | |
| 2021/0270080 | A1 * | 9/2021 | Belding | E05F 15/79 |
| 2022/0282551 | A1 * | 9/2022 | Hall | E05F 15/665 |
| 2022/0333425 | A1 * | 10/2022 | Hall | E05F 15/665 |
| 2022/0333426 | A1 * | 10/2022 | Hall | E05F 15/665 |
| 2025/0122757 | A1 * | 4/2025 | Connell | E05F 15/79 |
| 2025/0257603 | A1 * | 8/2025 | Hall | E05F 15/665 |

* cited by examiner

MOUNTING ASSEMBLY FOR AUTOMATED WINDOW ACTUATION MECHANISM AND METHOD

FIELD OF THE DISCLOSURE

The disclosure relates generally to automated window actuation mechanisms and in particular to mounting systems that facilitate the installation and removal of such mechanisms from a window casing fixture.

BACKGROUND OF THE DISCLOSURE

Window casing fixtures having multiple sashes are commonly installed in building applications. Window casing fixtures are conventionally actuated manually to meet ventilation and security requirements.

Such fixtures include double-hung windows having two sashes configured to slide vertically relative to each other within a window sill casing when actuated between open and closed configurations. Double-hung windows are commonly used in new building and replacement window applications. Window components including the framing and sash may be manufactured from different materials including wood, aluminum, vinyl, fiber glass, wood-clad and composite combinations of materials.

Systems exist that automate the process of window actuation through the use of motorized components that are physically mounted to a window sill casing. Such automated systems are permanently affixed to a window fixture by being built into or otherwise integrated within elements of a window sill casing or by affixing or otherwise permanently mounting drive and mounting components to a window sill casing and sashes by means such as screws, fasteners, nails or the like.

This conventional installation approach involves the use of hardware tools and the application of carpentry trade skills that are complex to execute without damaging a window fixture. The work is expensive, time-consuming and involves making permanent changes to a window assembly.

These problems are pronounced with elderly individuals who may lack the strength and ability to install an automated window actuation assembly, inclusive of the handicaped, wheelchair bound or bedridden, as well as renters who may lack the permission from a landlord to make permanent changes to fixtures in a rented property.

There is a need for an automated window actuation mechanism mounting assembly that overcomes these problems.

SUMMARY OF THE DISCLOSURE

Disclosed is automated window actuation mechanism mounting assembly that provides for the simplified installation and removal of a window actuation mechanism to and from a window fixture.

In particular, the assembly allows for the installation and removal of a window actuation mechanism to and from a window fixture without the use of hardware tools and/or the application of carpentry skills. In particular, the assembly allows for installation and removal without damaging window fixtures.

Other objects and features of the disclosure will become apparent as the description proceeds, especially when taken in conjunction with the accompanying drawings illustrating one or more illustrative embodiments.

DETAILED DESCRIPTION

Figure 1:
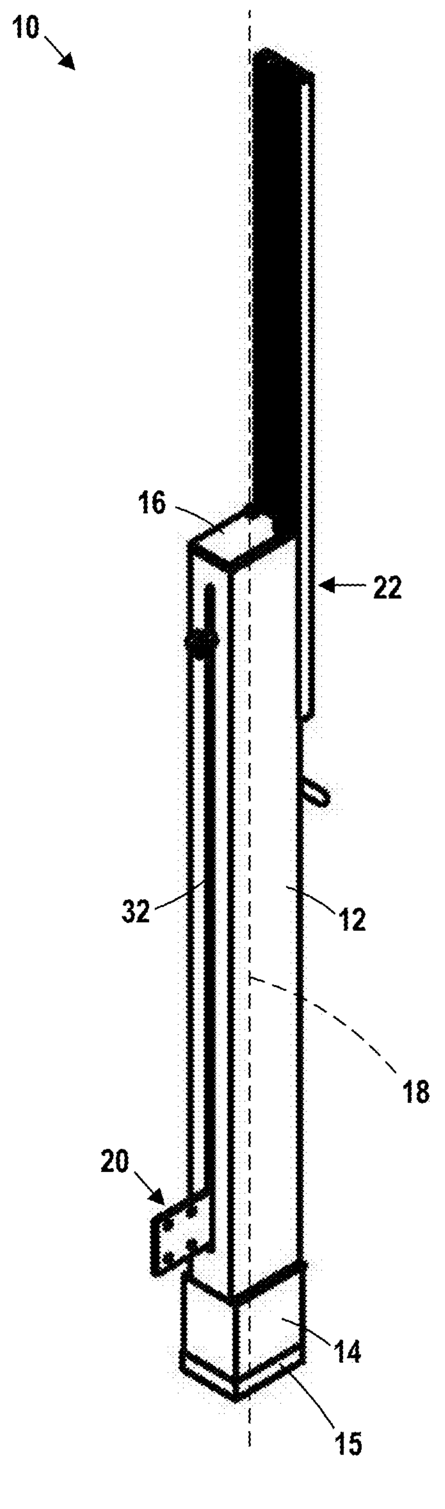
FIG. 1 is a perspective view of an automated window actuation mechanism mounting assembly in accordance with this disclosure.
Figure 2:
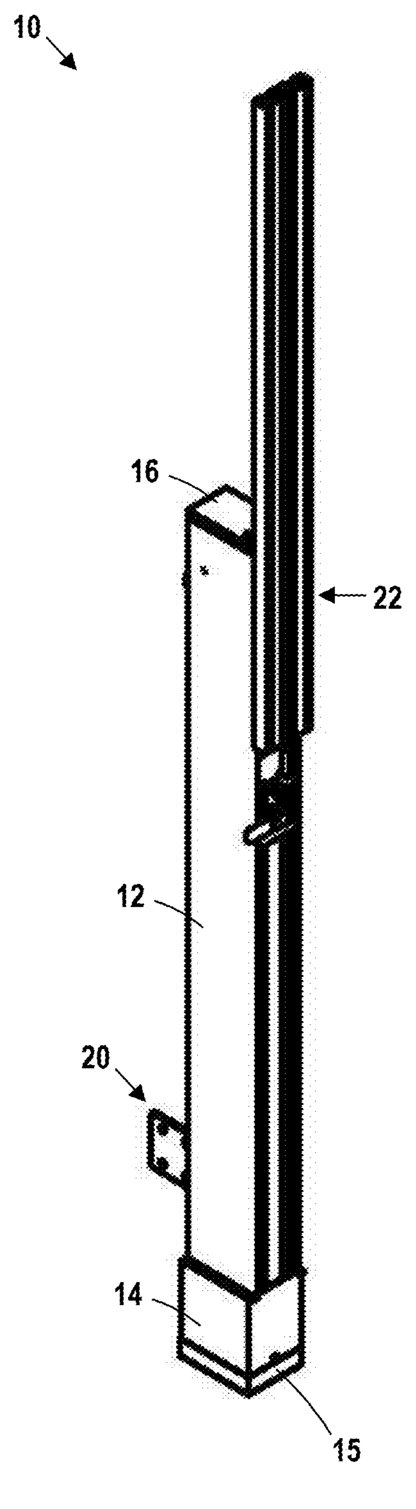
FIG. 2 is an alternate perspective view of the assembly shown in FIG. 1.
Figure 3:
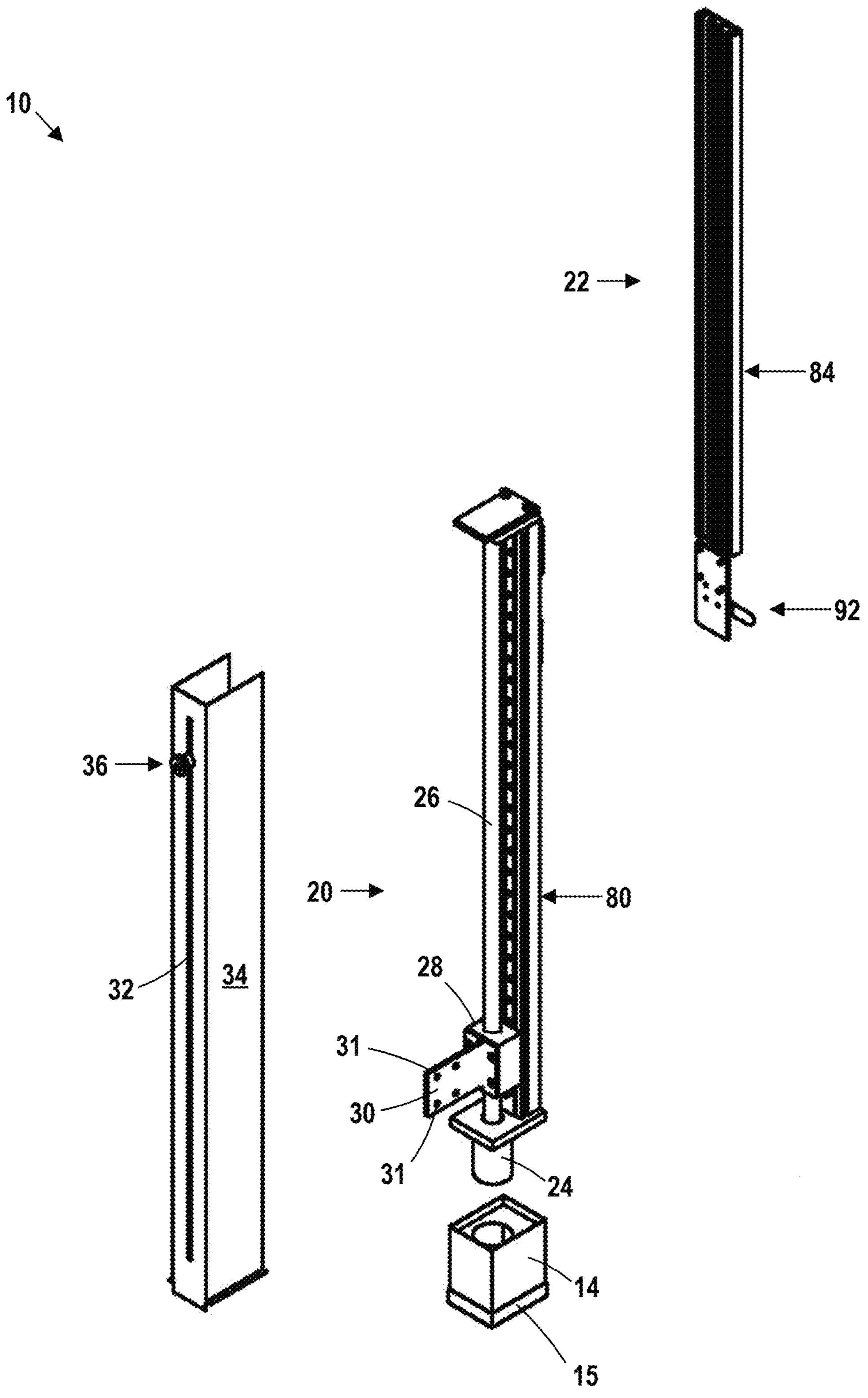
FIG. 3 is an exploded perspective view of the assembly shown in FIG. 1.
Figure 4:
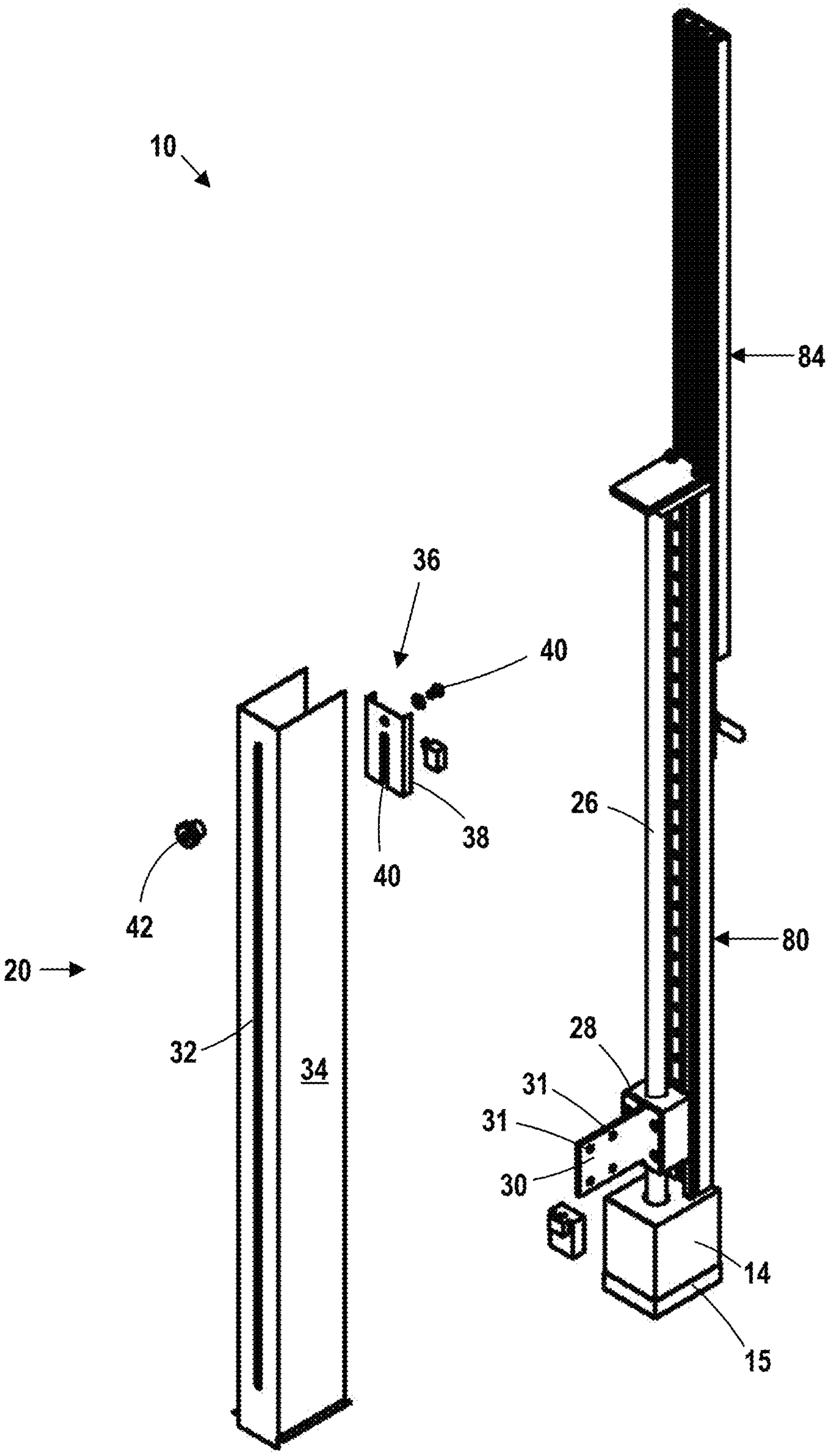
FIG. 4 is an exploded perspective view of the assembly shown in FIG. 1.

Disclosed is a mounting assembly 10 for an automated window actuation mechanism.

Assembly 10 includes a generally elongate, cuboid body 12 that extends from body base 14 to body top 16 along a major assembly vertical axis 18.

Body base 14 may include a bottom mounting pad 15 made of rubber or a like elastic material to facilitate engagement during installation and prevent damage to sill materials.

Assembly body 12 houses window actuation assembly 20 and window fixture mounting assembly 22.

Window actuation assembly 20 allows for the actuation of a window sashes between open and closed configurations within a window fixture casing.

Assembly 20 includes a motor 24 located proximate body base 14. Motor 24 may be a motorized linear actuator adapted to turn lead screw 26, oriented in parallel with major axis 18. The turning of lead screw 26 actuates carriage element 28 upwardly and downwardly along lead screw 26 and likewise along axis 18.

Motor 24 is coupled to a controller unit (not illustrated) which may be a programmable logic controller (PLC) or like computerized or circuit-actuated controller capable of providing activation and de-activation instructions to motor 24. Such instructions may include operation of the motor to actuate carriage element 28 in an upward or downward direction to likewise open or close a window fixture at a user's instruction.

In embodiments, the controller unit is adapted to receive instructions through use of a control device 25 that provides a remote wireless signal such as a bluetooth signal to activate or de-activate motor 24.

In embodiments, motor 24 is an electric motor that may be powered by an interconnected battery unit (not illustrated) or by connection to a conventional wired AC power source.

A lift arm member 30 is coupled to carriage element 28. Lift arm member 30 may have the form or a generally flat plate having mounting apertures 31 as shown in the figures and is adapted to engage actuate a window sash as explained below.

Lift arm member 30 is adapted to fit within body slot aperture 32 located in assembly body casing 34.

Top travel stop 36 includes a stop plate 38 having a stop plate notch 40. Top travel stop 36 may be installed to body slot aperture 32 through use of fastener elements 40, 42 and is adapted to limit upper travel of lift arm member 30 along body slot aperture 32 as explained below.

Figure 5:
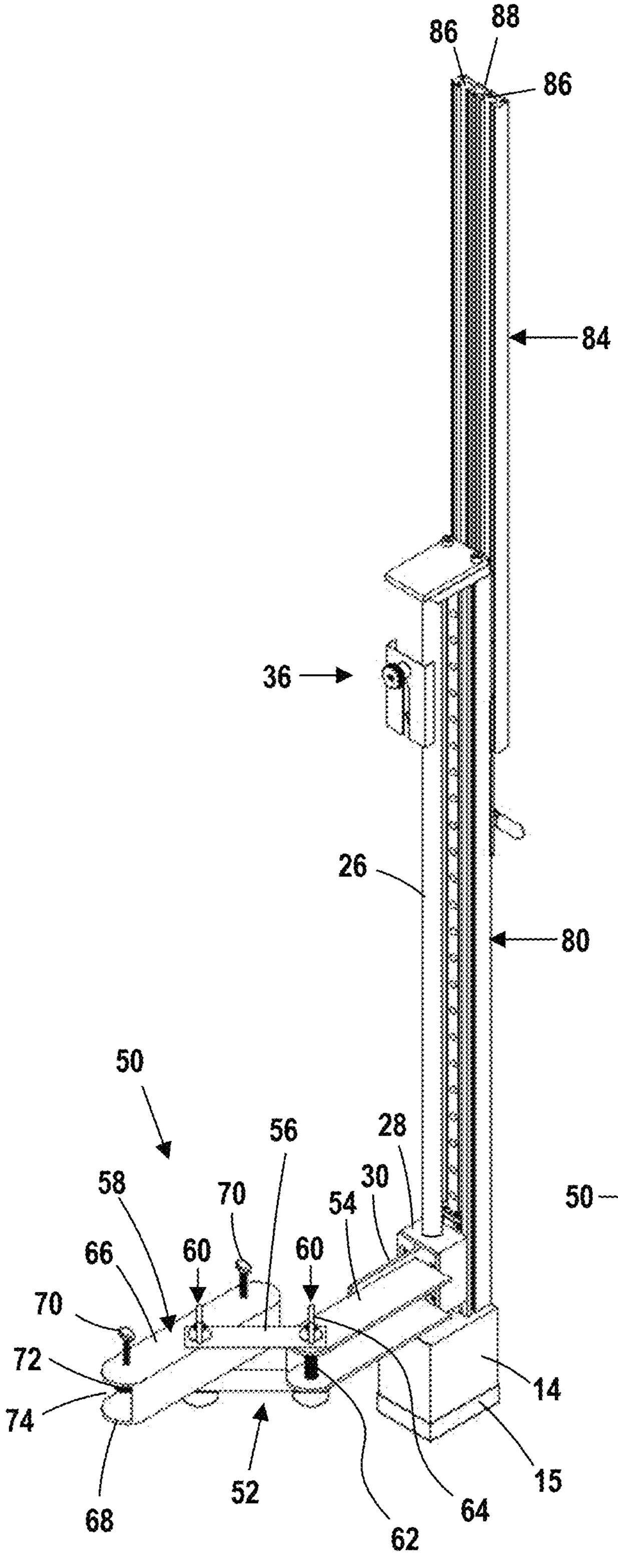
FIG. 5 is a perspective view of an automated window actuation mechanism mounting assembly including a mounting bracket assembly.
Figure 6:
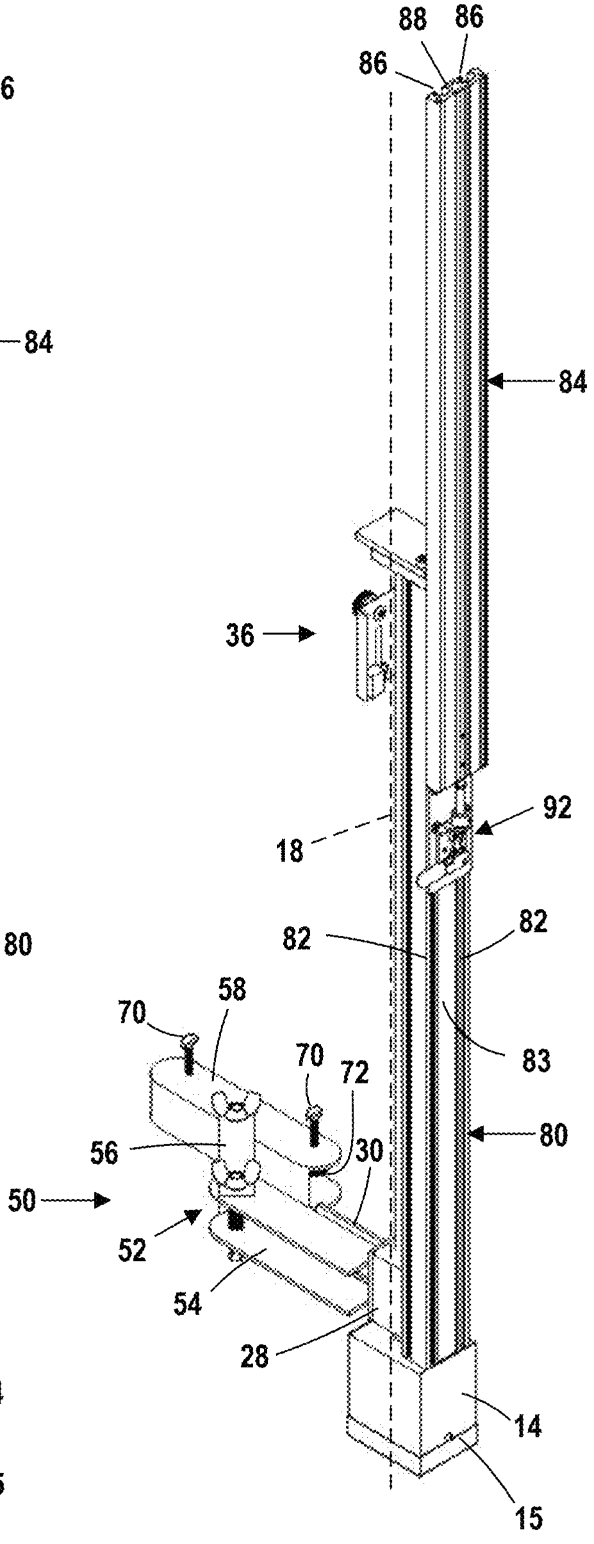
FIG. 6 is an alternate perspective view of the assembly shown in FIG. 5.
Figure 7:
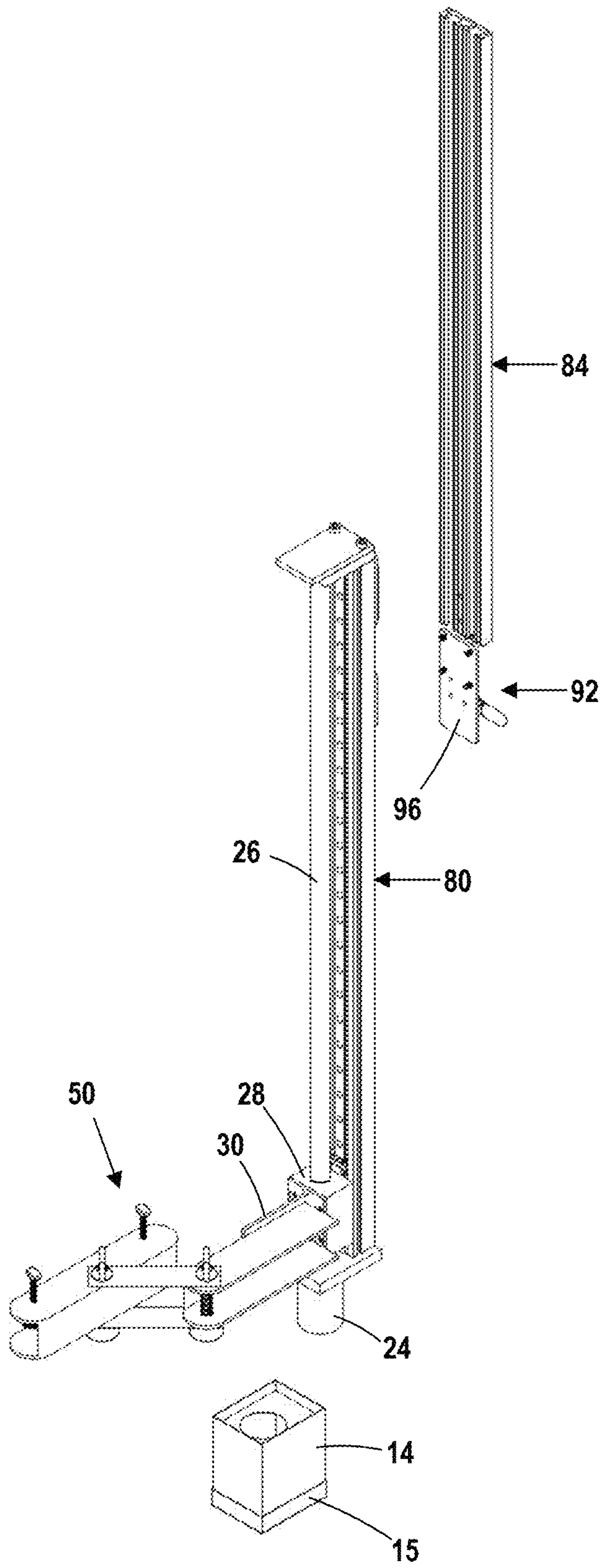
FIG. 7 is an exploded perspective of the assembly shown in FIG. 5.

FIG. 5 illustrates assembly 10 having a mounting bracket assembly 50.

Mounting bracket assembly 50 includes an adjustable mounting arm 52 made up of first and second elongate rails 54, 56 and window engaging bracket 58.

Rail 54 is joined to lift arm member 30 by fastens extended through the arm member 30 plate body.

Rails 54 and 56 are joined together by screw assembly 60, having an elongate bolt 62 and thumb-fastener 64. Rail 56 is joined to window engaging bracket 58 by a like screw assembly 60.

Window engaging bracket 58 has the general form of an elongate C-clamp with top and bottom clamp walls 66, 68. Top wall 66 includes a pair of bracket screw clamps 70 extending to an engagement pad 72 located within C-clamp mouth 74.

Window fixture mounting assembly 22 allows for the installation and removal of assembly 10 to and from window fixture casing.

Assembly 22 includes an elongate mounting base 80 located on a side of body 12 opposed from actuation assembly 20.

Mounting base 80 extends along body 12 and includes a pair of elongate rail channels 82 located to either side of an outwardly-facing base land surface 83. Channels 82 and surface 83 extend along base 80 generally parallel to major assembly vertical axis 18.

Assembly 22 further includes a sliding tension arm 84. Arm 84 includes a pair of elongate rail arm channels 86 adapted to engage channels 82 in base 80 to allow arm to extend upwardly and downwardly relative to mounting base 80.

Figure 9:
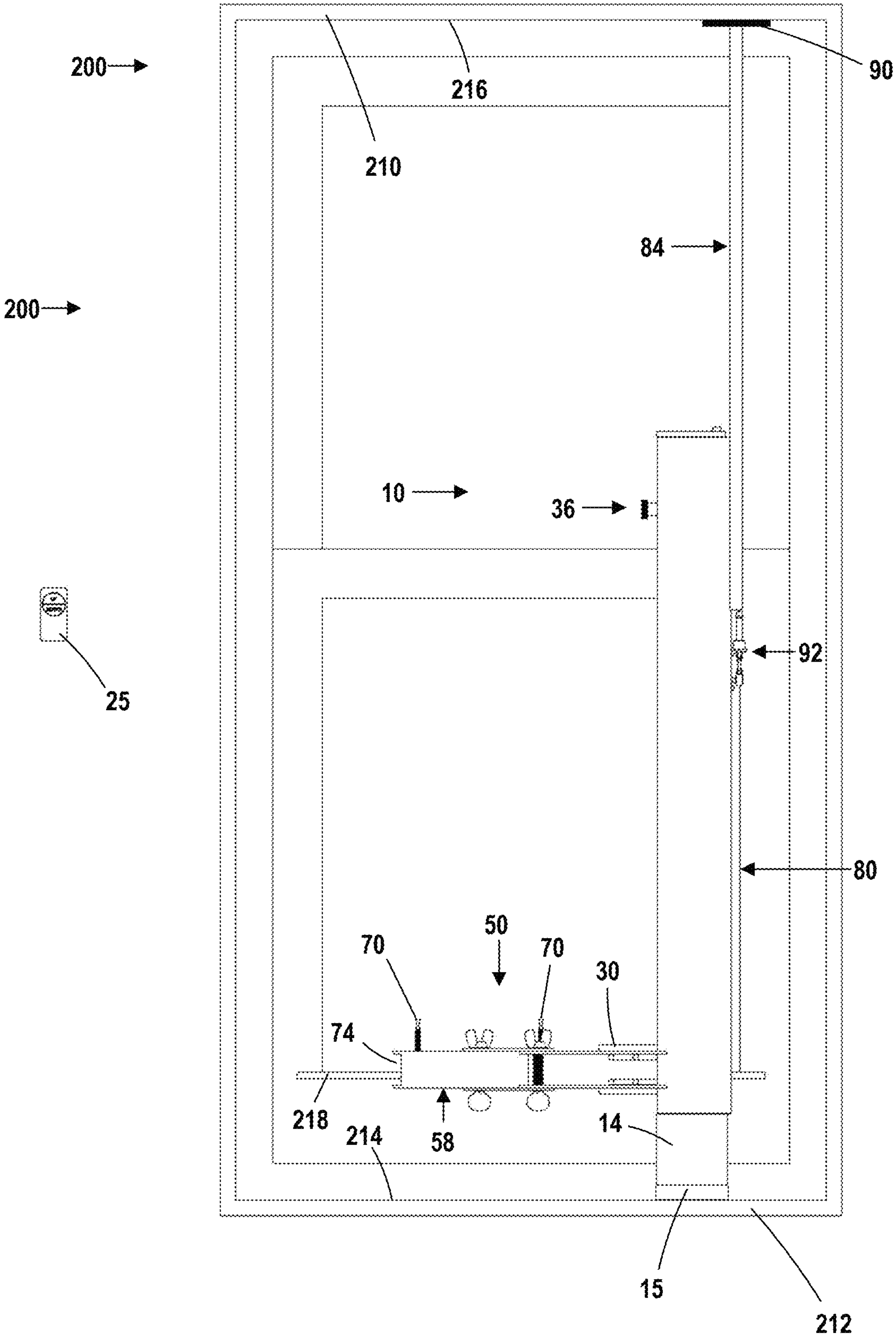
FIG. 9 is a front view of the assembly shown in FIG. 5 installed on a window fixture.
Figure 10:
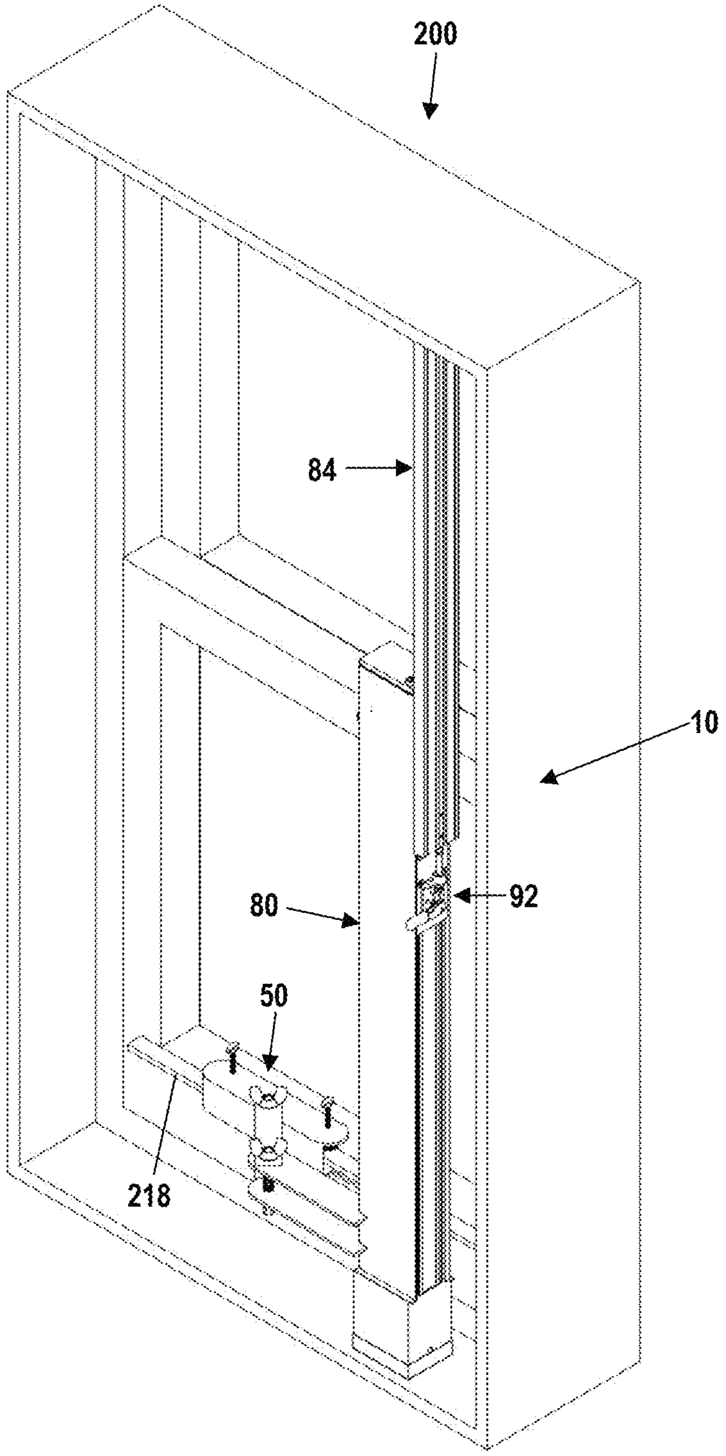
FIG. 10 is a perspective view of the assembly shown in FIG. 9 installed on a window fixture.
Figure 11:
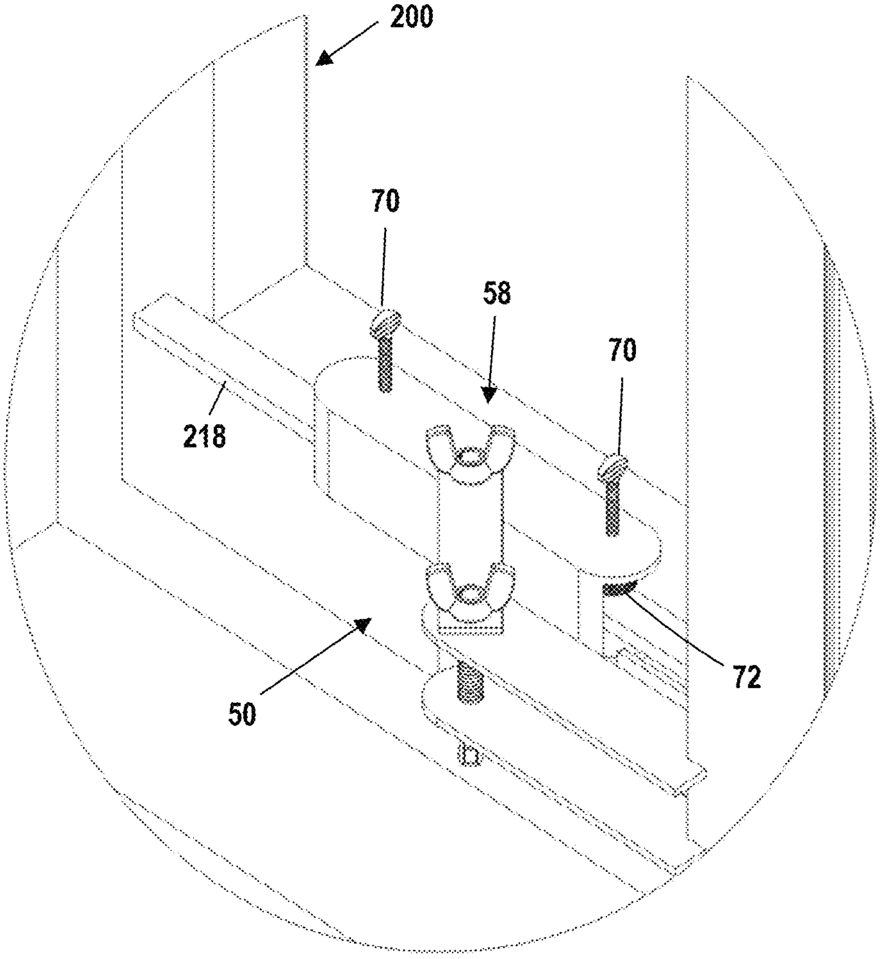
FIG. 11 is a detail view of an assembly window mounting bracket.

The upper free end 88 of arm 84 is adapted to engage a window sill casing and may include a top mounting pad 90 made of rubber or a like elastic material to facilitate engagement during installation and prevent damage to sill materials. See FIG. 9.

Arm 84 further includes tension bar clamp 92. Clamp 92 allows a user to fix the position of arm 84 relative to base 80. Clamp 92 has a generally flat body with a top face 94 and bottom face 96. Clamp 92 is located in rail channels 82 in mounting base 80 through use of corresponding clamp channels in bottom face 96 (not illustrated).

Clamp 92 includes a latching assembly 98 located at top face 94. Assembly 98 allows for the securement of arm 84 to mounting base 80.

Actuation of latching assembly 98 handle 100 turns cam 102 and cam post 104 located at the center of cam 102.

Figure 8:
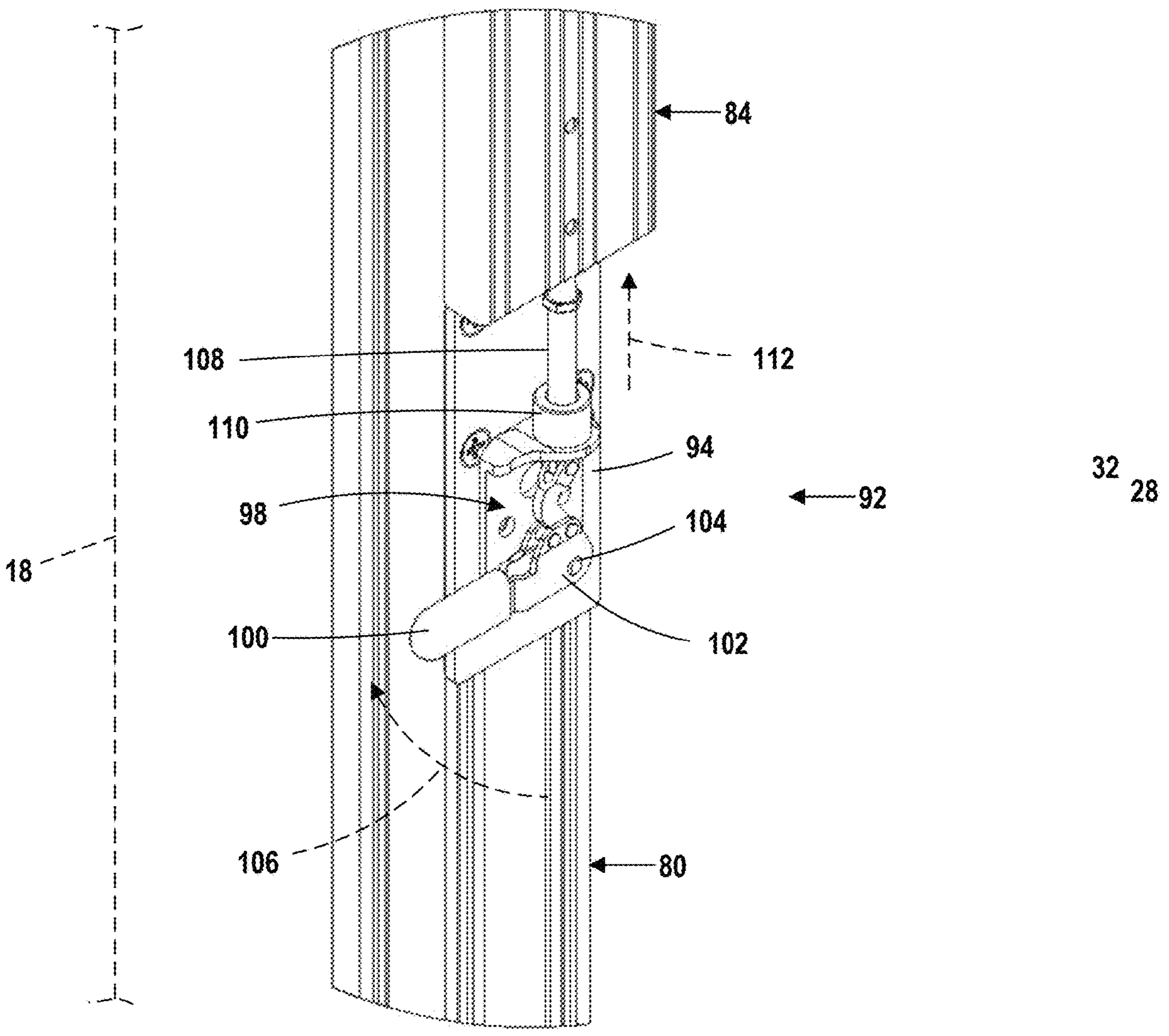
FIG. 8 is a detail view of an assembly tension bar clamp.

As handle 100 is actuated from an unlocked position, wherein handle 100 is positioned generally parallel to axis 18, to a locked position in the direction of arrow 106, wherein handle 100 is positioned generally perpendicular to axis 18 as show in FIG. 8, assembly 98 accomplishes two functions.

First, cam 102 engages push rod 108, located within collar 110. Push rod 108 in turn is moved in the direction of arrow 112 and actuated against a bottom end of arm 84 to move arm 84 into a fully locked position at the installation of assembly 10 in a window fixture as explained below.

Secondly, as handle 100 is actuated from an unlocked position to a locked position in the direction of arrow 106, cam post 104 is moved inwardly and toward mounting base 80 to engage surface 83. The engagement of post 104 surface 83 secures the position of sliding tension arm 84 relative to mounting base 80 at the installation of assembly 10 in a window fixture as explained below.

Use of assembly 10 will now be described.

Assembly 10 is positioned on the interior of a window sill fixture 200 having a sill head 210 and a sill stool 212 so that body base 14 is proximate to stool 212 and mounting pad 15 is engaging stool top surface 214.

A user then extends arm 84 upward relative to base 80 until top mounting pad 90 engages sill head bottom surface 216.

A user then then actuates tension bar clamp 92 handle 100 from an unlocked position to a locked position.

Upon actuation of handle 100, push rod 108 and arm 84 are likewise moved toward sill head 210 to allow assembly 10 to further engage window sill fixture 200. Simultaneously, cam post 104 engages base 80 surface 83 to secure the position of sliding tension arm 84 relative to mounting base 80.

At installation of assembly 10, a user further locates mounting bracket assembly 50 window engaging bracket 58 proximate window lift 218 so that a portion of window lift 218 is located in C-clamp mouth 74. When this is accomplished, bracket screw clamps 70 are actuated so that engagement pads 72 engage a window lift 218 to secure mouth 74 thereto. Screw assemblies 60 are then actuated to secure the location of rails 54, 56 within assembly 50.

A user then locates top travel stop 36 at a desired location along body slot aperture 32. A user to may locate stop 36 at a higher position along body slot aperture 32 to provide for the wider opening of window sill fixture 200 or a lower position along body slot aperture 32 to provide for the a smaller window opening.

At this point, assembly 10 is fully installed onto window sill fixture 200.

At activation of motor 24 by direct input into assembly 10 or by use of a remote control device 25, lift arm member 30 is actuated upward or downward, likewise actuating mounting bracket assembly 50 to move window lift 218 upward or downward as desired by a user.

Removal of assembly 10 from window sill fixture 200 involves the reversal of the above installation steps.

The installation and removal of assembly 10 from fixture 200 is completed without the use of hardware tools, without the application of carpentry skills and without damaging the window fixture.

While this disclosure includes one or more illustrative embodiments described in detail, it is understood that the one or more embodiments are each capable of modification and that the scope of the disclosure is not limited to the precise details or embodiments set forth but includes modifications obvious to a person of ordinary skill in the relevant art including (but not limited to) changes in material selection, size, alternative means to mount the assembly to a window casing and the like, and also such modifications as fall within the following claims.

What is claimed is:

1. An assembly comprising a body having a major axis extending from a body top to a body base, said body comprising a motor coupled to a carriage element, said carriage element comprising a lift arm member located on one side of said body, said lift arm member coupled to a mounting bracket assembly, said mounting bracket assembly comprising one or more rail members and a window engaging bracket, said window engaging bracket comprising a top wall element, a bottom wall element, one or more fasteners coupled to said top wall element or said bottom wall element, said body further comprising a mounting base located adjacent said lift arm member, said mounting base comprising one or more elongate rail channels and an elongate land surface located proximate said rail channels, said one or more elongate rail channels and elongate land surface extending generally parallel to said major axis, and comprising a tension arm having one or more elongate rail arm channels engaging said one or more rail channels and a clamp element joined to said tension arm and said mounting base, said clamp element comprising a push rod and a cam post engaging said mounting base, said clamp element comprising a first position wherein said push rod engages said tension arm and a second position wherein said push rod is disengaged from said tension arm, wherein said clamp element first position affixes the position of said tension arm relative to said mounting base.

2. The assembly of claim 1 wherein said body base comprises a base mounting pad.

3. The assembly of claim 2 wherein said tension arm comprises a top having an arm mounting pad.

4. The assembly of claim 1 wherein said motor is a linear actuator.

5. The assembly of claim 1 wherein said motor is battery powered.

6. The assembly of claim 1 wherein said motor comprises a controller unit adapted to receive wireless control signals.

7. The assembly of claim 1 wherein a said fastener coupled to said top wall element or said bottom wall element comprises a bracket screw clamp, said bracket screw clamp comprising an engagement pad, said engagement pad located between said top wall element and said bottom wall element.

8. The assembly of claim 7 wherein said clamp element is in said first position, said body base engages a window sill fixture stool and said tension arm engages a window sill fixture sill head.

9. An assembly comprising:

a body having a major axis extending from a body top to a body base a body slot aperture on one side of said body and extending from said body base to said body top, said body comprising a motor coupled to a carriage element said carriage element comprising a lift arm member located in said body slot aperture, said lift arm member coupled to a mounting bracket assembly, said mounting bracket assembly comprising one or more rail members and a window engaging bracket, said window engaging bracket comprising a top wall element, a bottom wall element, one or more fasteners coupled to said top wall element or said bottom wall element, said one or more fasteners comprising an engagement pad located between said top wall element and said bottom wall element, said body further comprising a mounting base located adjacent said lift arm member, said mounting base comprising one or more elongate rail channels and an elongate land surface located proximate said rail channels, said one or more elongate rail channels and elongate land surface extending generally parallel to said major axis, and comprising a tension arm having one or more elongate rail arm channels engaging said one or more rail channels and a clamp element joined to tension arm and said mounting base, said clamp element comprising a push rod and a cam post engaging said mounting base, said clamp element comprising a first position wherein said push rod engages said tension arm and a second position wherein said push rod is disengaged from said tension arm, wherein said clamp element first position affixes the position of said tension arm relative to said mounting base.

10. The assembly of claim 9 wherein said body base comprises a mounting pad.

11. The assembly of claim 10 wherein said tension arm comprises a top having a mounting pad.

12. The assembly of claim 10 wherein said motor is a linear actuator.

13. The assembly of claim 9 wherein said motor is battery powered.

14. The assembly of claim 9 wherein said motor comprises a controller unit adapted to receive wireless control signals.

15. The assembly of claim 9 wherein said body base engages a window sill fixture stool and said tension arm engages a window sill fixture sill head.

16. The assembly of claim 9 wherein said body slot aperture comprises a travel stop.

* * * * *